(12) United States Patent
Sharma et al.

(10) Patent No.: US 8,190,140 B1
(45) Date of Patent: May 29, 2012

(54) SYSTEM AND METHOD FOR RESTORING INFORMATION TO A DEVICE

(75) Inventors: Sanjay K. Sharma, Olathe, KS (US);
Benjamin P. Blinn, Leawood, KS (US);
Lois E. Fagan, Boonville, MO (US);
Kenneth R. Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 547 days.

(21) Appl. No.: 12/267,707

(22) Filed: Nov. 10, 2008

(51) Int. Cl.
*H04M 1/725* (2006.01)

(52) U.S. Cl. .................................. 455/419; 707/202

(58) Field of Classification Search .................. 455/419
See application file for complete search history.

(56) References Cited

U.S. PATENT DOCUMENTS

| | | | |
|---|---|---|---|
| 2005/0026575 A1* | 2/2005 | Nagatomo | 455/127.1 |
| 2006/0230081 A1* | 10/2006 | Craswell et al. | 707/204 |
| 2007/0022217 A1* | 1/2007 | Ayres et al. | 709/247 |
| 2008/0133614 A1* | 6/2008 | Scott | 707/202 |
| 2009/0006589 A1* | 1/2009 | Forbes et al. | 709/223 |

* cited by examiner

*Primary Examiner* — Dwayne Bost
*Assistant Examiner* — Joseph Dean, Jr.

(57) ABSTRACT

A method, system, and medium are provided for capturing an image of information on a device. The information is stored on the device. The device is reset, and information from the captured image is restored on the device.

20 Claims, 4 Drawing Sheets

SYSTEM AND METHOD FOR RESTORING INFORMATION TO A DEVICE

BACKGROUND

Mobile devices may be reset for various reasons. However, resetting a mobile device may cause the loss of information, such as contact information or device settings.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In a first aspect, a set of computer-useable instructions provide a method of capturing an image of information on a device, storing the image, resetting the device and restoring information from the captured image on the device.

In a second aspect, a set of computer-useable instructions provide a method of detecting a reset of a device, detecting memory on the device, capturing an image of information on the device, and encrypting and storing the image. The device is reset and powered off. The stored image is verified, the information from the image may or may not be restored to the device, and the stored image is deleted.

In a third aspect, a set of computer-useable instructions provide a method of detecting a reset of a device, detecting memory on the device, capturing an image of information on the device, and encrypting and storing the image. The device is reset and powered off. It is determined whether or not the device is capable of obtaining information from a network. If the device is capable of obtaining information the network, then information from the network is obtained. The stored image is verified, the information from the image may or may not be restored to the device, and the stored image is deleted.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
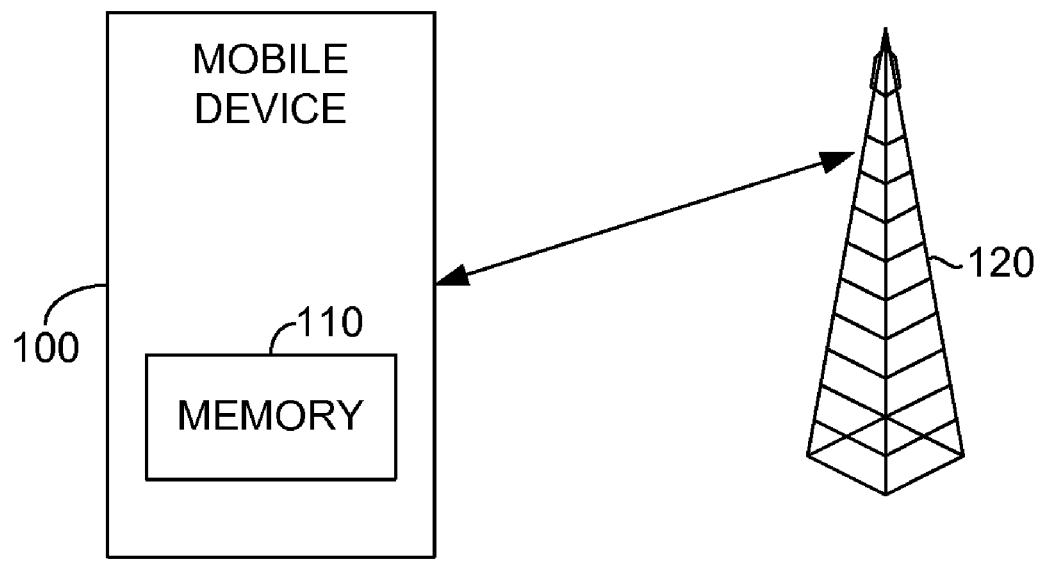
FIG. 1 depicts a network diagram in accordance with an embodiment of the present invention.

Embodiments of the present invention provide systems and methods for restoring information to devices. Although the term "step" might be used herein to connote different components of methods or systems employed, the term should not be interpreted as implying any particular order among or between various steps herein disclosed unless and except when the order of individual steps is explicitly described.

Throughout the description of the present invention, shorthand notations are used to aid the understanding of certain concepts pertaining to the associated system and services. These shorthand notations are intended to help provide an easy methodology of communicating the ideas expressed herein and are not meant to limit the scope of the present invention. For example, "S" means "step" and indicates a numbered step in the accompanying flow diagrams.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention include a device 100. In the example in FIG. 1, the device is a mobile device. The device 100 may be any mobile or wireless device that is capable of receiving a transmitted signal, or a device 100 may be a component of a system where the system uses some form of wireless communication. Examples of mobile devices include cellular phones, personal digital assistants and other portable electronic devices used for accessing or obtaining data. The signal or information from the device 100 is communicated to a network 120.

The network 120 may range from more than one interconnected media, computer, server or device. The network 120 may be an area within a range of a tower or other signal source. Any area where information or data may be sent to a device 100, or any area where a device 100 may attempt to access information or data, may constitute a network 120. The network 120 may include service or participation from a third-party provider on some level, such as local providers or equipment providers. Radio signals may be used to transmit and receive communications on the network 120. The network 120 may use other types of signals to transmit analog or digital information.

The device 100 may be reset for various reasons. For example, a device 100 may be reset to resolve hardware or software issues, or it may be reset to begin, change or update a service plan. Additionally, changes or updates to software, hardware or the network 120 may lead to resetting the device 100. The reset would usually be performed by support specialists, such as customer support or technicians, but it may be performed by any individual, organization or software with the ability to reset the device 100. This may be referred to as a hard reset or a master reset. In order to implement or complete the reset, the device 100 may be powered off and back on.

Resetting the device 100 may cause the loss of information on the device 100. The information that may be lost during a reset includes the settings of the device 100, such as the volume levels, text size, font or color. Other settings may include ring tones, alarms or other sounds or vibrations used by the device 100. Settings may be any customization of the device 100, including settings related to calls or other forms of communication, such as SMS messages or electronic mail. Additionally, settings may be geographically-based or intended to aid users with disabilities or other visual or hearing difficulties.

The information on the device 100 may also include content stored on the device 100 or access to content. The content may be audio or visual content, or related to participation in programs or shared applications. Other information on the device 100 may be contact information, call logs, sent or received messages or destinations on the network 120.

Information on the device 100 may be lost during a reset. Users of devices 100 may therefore be reluctant to reset a device 100 if they will lose information or the device 100 will revert to the default settings. For example, a user may want to preserve the contacts stored in a device 100. In another example, a user may want to retain the customized settings on the device 100. In some cases, users may choose to not reset the device 100, despite software or hardware issues affecting the device 100. In other cases, it may be necessary to reset the device 100 in order to use the device 100 effectively. In these cases, the user may be forced to sacrifice some information on the device 100 in order to restore the device's 100 functionality.

The loss of information may affect or frustrate users and support specialists. Additionally, the loss of information may interfere with use of the device 100 by the user. Therefore, providers of service to devices 100 may experience negative reactions by users. Users may terminate their relationship with a provider or a particular device 100. Additionally, there may be less activity involving the device 100 due to the loss of information, which may affect revenues related to the device 100.

An image of information on the device 100 may be captured or stored. The image may be a file or files, or any other means of capturing information that may be recreated, replicated or restored on the device 100. It may omit any portion of the information on the device 100, or it may contain all of the information on the device 100. The process of creating an image may include compressing information, or it may ignore empty or unused space in the device 100. The image may include information about the file system. Alternatively, the process of creating the image may ignore the file system and create a sector-by-sector copy of the information.

The image may contain the difference, or delta, between the information on the device at an earlier point and a later point. For example, the image may capture the difference between a device 100 when a user first receives or activates the device 100, and the device 100 at the time of or prior to a reset. In this case, the image would contain any information added to the device 100 or changed during use of the device 100, such as contact information and customized settings. On the other hand, the image may contain any new or changed information since the last time a device 100 was reset. Any two points may be used to determine the delta captured by the image, such as two points representing dates or amounts of information on the device 100.

A captured image may be stored in the memory 110 in the device 100 as shown in FIG. 1. The memory 110 may be any of the media types described above, or any recording media capable of retaining information. A memory card, cache or virtual memory may be used. In some cases, it may be determined whether adequate or appropriate memory 110 exists prior to capturing or storing the information. Based on the amount of memory 110, the image may or may not be captured or stored, or the amount of information in the image may be increased or decreased.

After an image of information on the device 100 is captured, the image may be encrypted. In general, encryption transforms information for security purposes. The encryption may be any process of making the information unreadable without a key or other tool used to access an encrypted image. The process of encryption may be symmetric or asymmetric. In the present invention, the encrypted image may be decrypted and read by the device 100. However, the encrypted information may not be accessible or readable by other devices that do not possess the appropriate key or tool. The encrypted information may only be capable of being restored after the reset of the device 100, and this restoration may only be permitted to occur one time.

Some devices 100 are capable of obtaining information from a network 120. Devices 100 may automatically communicate with a network 120, or they may be manually instructed to request information from the network. If a device 100 is capable or obtaining information from a network 120, then this information may be omitted from the captured image.

After a device 100 is reset, it may be optional to restore information from the captured image to the device 100. A user, support specialist or technician may have the choice to restore some or all of the information from the image. Additionally, after information has been restored, or after it is determined not to restore some or all of the information, then the information in the captured image may be deleted or removed from memory 110.

Figure 2:
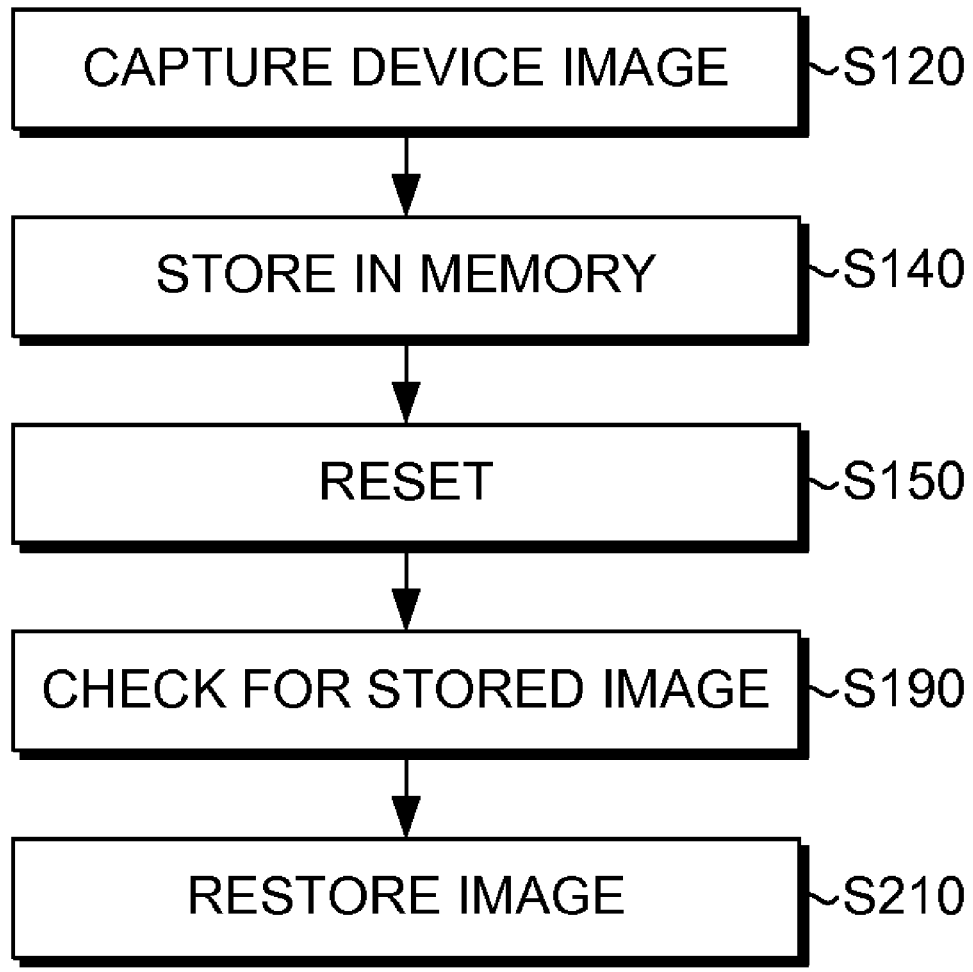
FIG. 2 depicts a flow diagram in accordance with an embodiment of the present invention.

FIG. 2 is a flow diagram of showing an embodiment of the present invention. In FIG. 2, an image of a device 100 is captured (S120). This captured image may be stored in the memory 110 in S140. In S150, the device 100 is reset. It is determined whether a captured image was stored in S190. The verification in S190 may be performed automatically by software in the device 100 or on the network 120, or it may be manually requested. Information from the image is restored to the device 100 (S210).

The information restored to the device 100 in S210 may be some or all of the information captured in the image in S120. Information from a certain time period, or certain types of information, may be restored in S210. For example, a user may prefer to restore contact information, but not other types of data or content. In other cases, only the information not obtained from the network 120 may be restored to the device 100.

Figure 3:
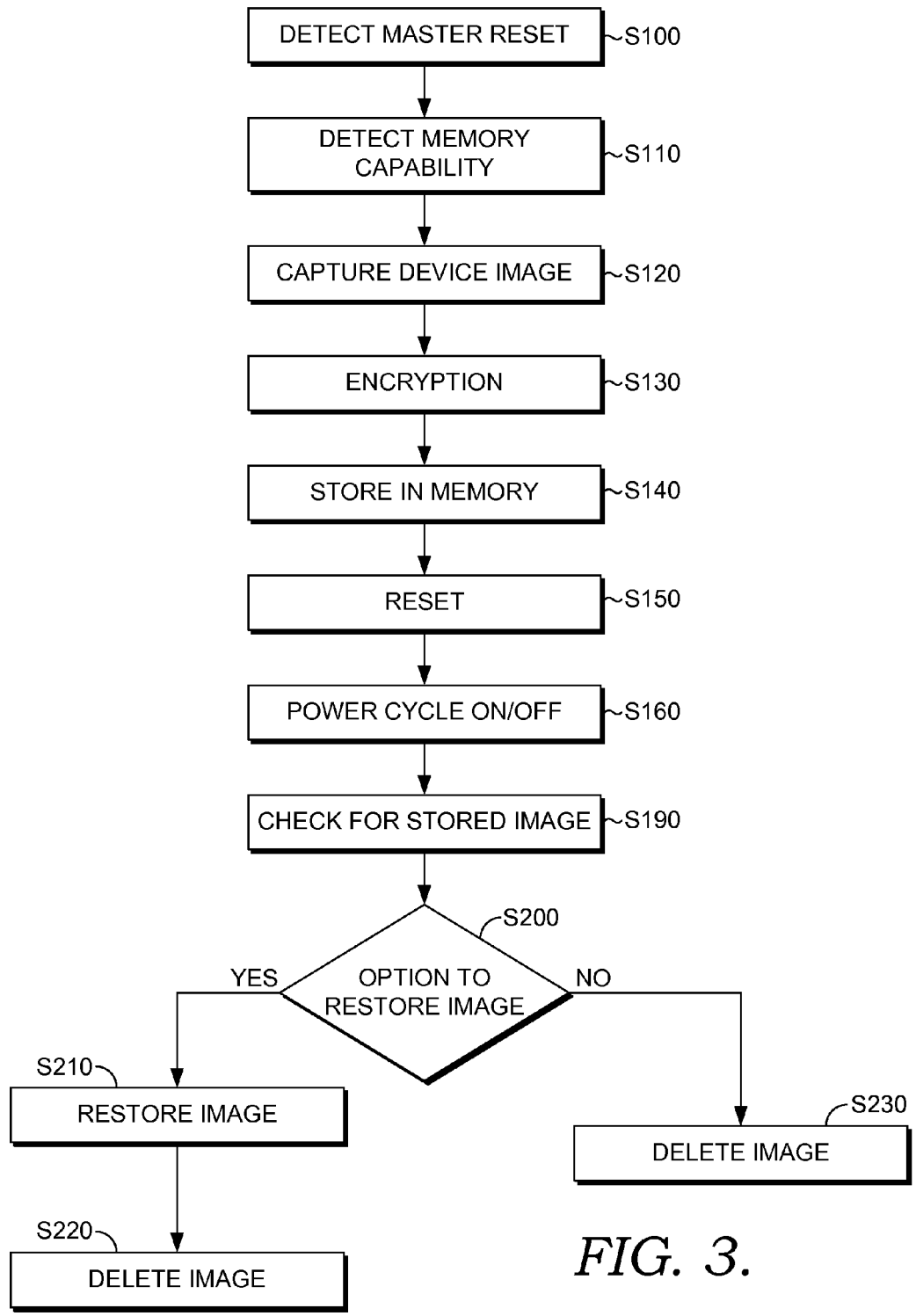
FIG. 3 depicts a flow diagram in accordance with an embodiment of the present invention.

In FIG. 3, a reset of a device 100 is detected in S100. In the specific example in FIG. 3, this is referred to as a master reset. The memory 110 is detected in S110. S110 may detect the size, type or availability of memory 110. In one example, shown in FIG. 3, the capability of the memory 110 is detected in S110.

In S120, an image of information on the device 100 is captured. This information may be encrypted in S130, and the information may be stored in memory 110 in S140. The device 100 is reset in S150. The power to the device 100 is cycled in S160. In FIG. 3, the power is cycled by turning the power to the device on and/or off. The power cycling in S160 may be automatically or manually implemented.

It is determined whether a stored image exists in S190. In S200, the option to restore information from the image is presented. The user, support specialist or technician may determine whether or not to restore the image in S200. Additionally, software included in the device or on the network may determine whether or not to restore the image in S200.

If it is determined in S200 that information will be restored, then information from the image is restored in S210. After some or all of the information is restored to the device 100 in S210, the captured image may be deleted in S220. Alternatively, if it is determined that information will not be restored to the device 100, then the captured image may be deleted in S230.

Figure 4:
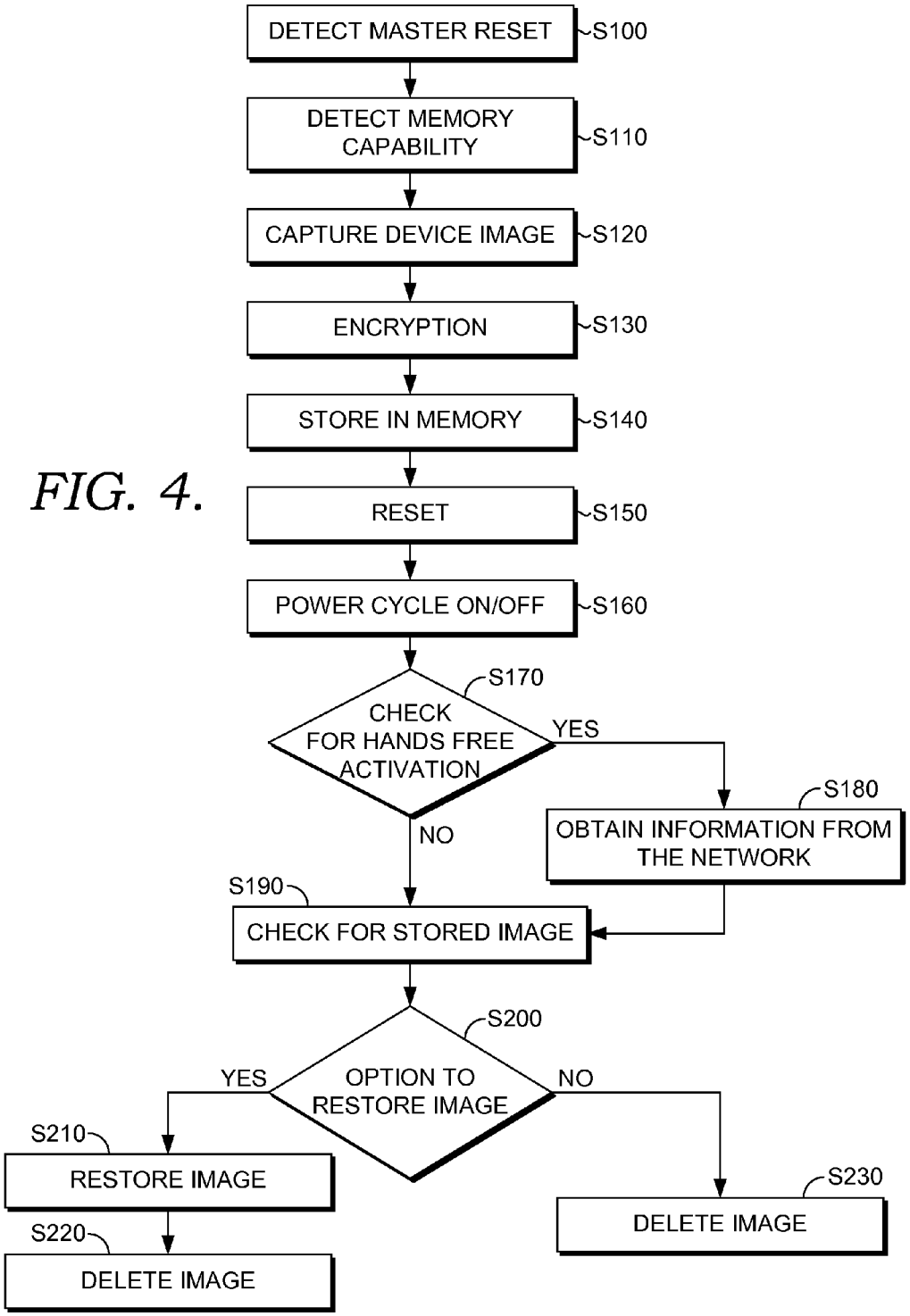
FIG. 4 depicts a flow diagram in accordance with an embodiment of the present invention.

FIG. 4 is a flow diagram illustrating another embodiment of the present invention. A reset of a device 100 is detected in S100, and the memory 110 of the device 100 is detected in S110. An image of the device 100 is captured in S120. This image is encrypted (S130) and stored in the memory 110 (S140). The device 100 is reset in S150, and the power to the device 100 is cycled in S160.

It is determined whether the device 100 is capable of obtaining information from the network 120 in S170. In the example in FIG. 4, the capability of obtaining information from the network 120 is referred to as hands free activation. If the device 100 is capable of obtaining information from the network 120, the information is obtained in S180.

In S190, it is determined whether or not a captured image was stored in the memory 110. The option to restore the image is presented in S200. As explained above, this option may be available to various individuals or software on the device 100 or network 120. The information from the image may be restored in S210. After some or all of the information is restored to the device 100 in S210, the captured image may be deleted in S220. Alternatively, if it is determined that information will not be restored to the device 100 in S200, then the captured image may be deleted in S230.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible non-transitory computer-readable media having computer-useable instructions embodied thereon for performing a method of restoring data, the method comprising:
   identifying information on the device that has changed since a previous image capture;
   identifying portions of the information that can be obtained from a network;
   capturing an image of the device based on the portions of the information that can be obtained from a network;
   storing the image;
   resetting the device;
   verifying the image is stored on the device; and
   restoring data from the captured image on the device.

2. The non-transitory media of claim 1 further comprising: wherein the media is housed in a mobile device.

3. The non-transitory media of claim 1 further comprising: detecting a reset of the device.

4. The non-transitory media of claim 1 further comprising: detecting a memory of the device.

5. The non-transitory media of claim 1 further comprising: encrypting the data in the captured image.

6. The media of claim 1 wherein capturing the image of the device based on the portions of the information that can be obtained from the network comprises only capturing portions of the information that cannot be obtained from the network.

7. The non-transitory media of claim 1 further comprising: deleting the data in the captured image.

8. The non-transitory media of claim 1 further comprising: wherein the information in the captured image includes contact information.

9. The non-transitory media of claim 1 further comprising: wherein the information in the captured image includes device settings.

10. The non-transitory media of claim 6 further comprising:
    obtaining the portions of the information that can be obtained from the network;
    restoring the portions of the information that can be obtained from the network to the mobile device.

11. One or more tangible non-transitory computer-readable media having computer-useable instructions embodied thereon for performing a method of restoring data, the method comprising:
    detecting a reset of a device;
    detecting a memory of the device;
    identifying information on the device that has changed since a previous image capture;
    identifying portions of the information that can be obtained from a network;
    capturing an image of the device based on the portions of the information that can be obtained from a network;
    encrypting the image;
    storing the image;
    resetting the device;
    cycling power of the device;
    verifying the image is stored on the device;
    determining whether or not to restore data from the captured image on the device; and
    restoring data from the captured image on the device.

12. The non-transitory media of claim 11 further comprising:
    wherein the media is housed in a mobile device.

13. The non-transitory media of claim 11 further comprising:
    deleting the captured image.

14. The non-transitory media of claim 11 wherein capturing the image of the device based on the portions of the information that can be obtained from the network comprises only capturing portions of the information that cannot be obtained from the network.

15. The non-transitory media of claim 11 further comprising:
    wherein an individual determines whether or not to restore the data from the captured image on the device.

16. The non-transitory media of claim 11 further comprising:
    wherein software determines whether or not to restore the data from the captured image on the device.

17. One or more tangible non-transitory computer-readable media having computer-useable instructions embodied thereon for performing a method of restoring data, the method comprising:
    detecting a reset of a device;
    detecting a memory of the device;
    identifying information on the device that has changed since a previous image capture;
    identifying portions of the information that can be obtained from a network;
    capturing an image of the device based on the portions of the information that can be obtained from a network;
    encrypting the image;
    storing the image;
    resetting the device;

cycling power of the device;
obtaining the portions of the information that can be obtained from the network;
verifying the image is stored on the device;
determining whether or not to restore data from the captured image on the device; and
deleting the stored image.

18. The non-transitory media of claim 17 further comprising:
wherein the media is housed in a mobile device.

19. The non-transitory media of claim 17 further comprising:
wherein the device automatically obtains the portions of the information that can be obtained from the network.

20. The non-transitory media of claim 17 further comprising:
wherein the device is instructed to obtain the portions of the information that can be obtained from the network.

* * * * *